US011956100B1

(12) United States Patent
Wei

(10) Patent No.: US 11,956,100 B1
(45) Date of Patent: *Apr. 9, 2024

(54) SYSTEM FOR SCALING NETWORK ADDRESS TRANSLATION (NAT) AND FIREWALL FUNCTIONS

(71) Applicant: AVIATRIX SYSTEMS, INC., Santa Clara, CA (US)

(72) Inventor: Xiaobo Sherry Wei, Palo Alto, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,625

(22) Filed: Sep. 9, 2022

Related U.S. Application Data

(63) Continuation of application No. 17/087,553, filed on Nov. 2, 2020, now Pat. No. 11,444,808, which is a continuation of application No. 15/280,890, filed on Sep. 29, 2016, now Pat. No. 10,826,725.

(60) Provisional application No. 62/234,590, filed on Sep. 29, 2015.

(51) Int. Cl.
*H04L 12/46* (2006.01)
*H04L 61/256* (2022.01)
*H04L 61/5007* (2022.01)

(52) U.S. Cl.
CPC ........ *H04L 12/4641* (2013.01); *H04L 61/256* (2013.01); *H04L 61/5007* (2022.05)

(58) Field of Classification Search
CPC ............. H04L 12/4641; H04L 61/2007; H04L 61/256
See application file for complete search history.

(56) References Cited

U.S. PATENT DOCUMENTS

| 8,289,968 | B1 * | 10/2012 | Zhuang | ............... | H04L 61/2539 370/252 |
| 9,055,117 | B1 * | 6/2015 | Dickinson | ........... | H04L 61/2557 |
| 2017/0026283 | A1 * | 1/2017 | Williams | ............ | H04L 61/2517 |

* cited by examiner

*Primary Examiner* — Chae S Lee
(74) *Attorney, Agent, or Firm* — Winstead PC

(57) ABSTRACT

According to one embodiment, a network device may be adapted to operate within a virtual private cloud where network address translation (NAT) is performed through virtual machines and each network address translation is handled differently by a different NAT control logic unit. The network device features one or more hardware processors, and a memory that stores at least a plurality of network address translation (NAT) control logic unit and demultiplexer logic. The demuliplexer logic, when executed, receives an incoming message and, based at least in part on information within the incoming message, determines a selected NAT control logic unit to receive at least a portion of the information within the incoming message. The selected NAT control logic unit handles address translation for routing of a message based on the incoming message to a public network.

9 Claims, 8 Drawing Sheets

Dashboard  Onboarding  Gateway  VPCs ▽  Settings ▽  Help ▽  ☐ admin ▽

Add  Delete  List

Create Scale-out NAT Solution/Project

Account Name: *  [ IT_dept ▽ ]
Project Name: *  [ my-nat ]
VPC ID: *  [ vpc-fda23c96 ▽ ]
VPC Region: *  [ us-west-2 ▽ ]
User Subnets: *  [ 10.34.1.0/24 ▽ ]
Demux Subnet CIDR: * [view]  [ 10.34.0.0/24 ▽ ]
Number of NAT Instances: *  [ 2| ◁▷ ]
Size of NAT Instances *  [ t2.micro ▽ ]
Distribution Algorithm: *  [ stc-port ▽ ]
Enable Logging:

[Add]

*FIG. 7*

SYSTEM FOR SCALING NETWORK ADDRESS TRANSLATION (NAT) AND FIREWALL FUNCTIONS

CROSS-REFERENCE TO RELATED PATENT APPLICATIONS

This application is a continuation of U.S. patent application Ser. No. 17/087,553 filed Nov. 2, 2020, now U.S. Pat. No. 11,444,808, issued Sep. 13, 2022, which is a continuation of U.S. patent application Ser. No. 15/280,890 filed Sep. 29, 2016, now U.S. Pat. No. 10,826,725 issued Nov. 3, 2020, which claims the benefit of priority on U.S. Provisional Application No. 62/234,590 filed on Sep. 29, 2015, the entire contents of which are incorporated by reference herein.

FIELD

Embodiments of the disclosure relate to the field of networking. More specifically, one embodiment of the disclosure relates to a scalable network architecture that is implemented in a public cloud and is configured to deploy multiple instances of virtual machines. Each of the virtual machine instances includes network address translation (NAT) functionality and is independently selected to handle data traffic from a virtual private cloud within the public cloud to the public network.

GENERAL BACKGROUND

Over the few decades, networks have become necessary and essential mechanisms that enable individuals to communicate and share data. Internet Protocol (IP) is a communication protocol that defines how computers, smartphones and other network devices communicate over one or more networks. These networks may include private networks and/or public networks such as the Internet. As part of a public network, a "public cloud" may be provided, under which services and resources are provided in a virtualized environment. Stated differently, a service provider allows resources, such as applications and/or storage, to be available to the general public via the public cloud. Examples of public clouds include Amazon® AWS, Google® Compute Engine and Microsoft® Azure Services Platform.

Many public clouds offer one or more virtual private networks within the public cloud (sometimes referred to as "virtual private clouds"). Maintained in accordance with a selected private Internet Protocol (IP) network address range (e.g., IPv4 address range), a virtual private network includes routing functions provided by the public cloud provider infrastructure that enables communications among virtual machines within the virtual private network. For virtual machines without a public IP address to communicate over a public network (e.g., Internet), however, network address translation (NAT) functionality must be provided. NAT functionality is directed to the remapping of one IP address space into another by modifying network address information in an IP datagram packet headers while they are in transit.

Currently, NAT functionality is implemented as part of a single virtual machine. Through this implementation, based on increased traffic levels, performance bottlenecks are appearing. Even where more powerful virtual machines are being used to conduct the address translation (NAT), performance limitations are real issues that require an immediate solution.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 7 is an exemplary embodiment of a graphic user interface for configuring the public network connectivity logic with scalable NAT functionality.

DETAILED DESCRIPTION

Figure 1:
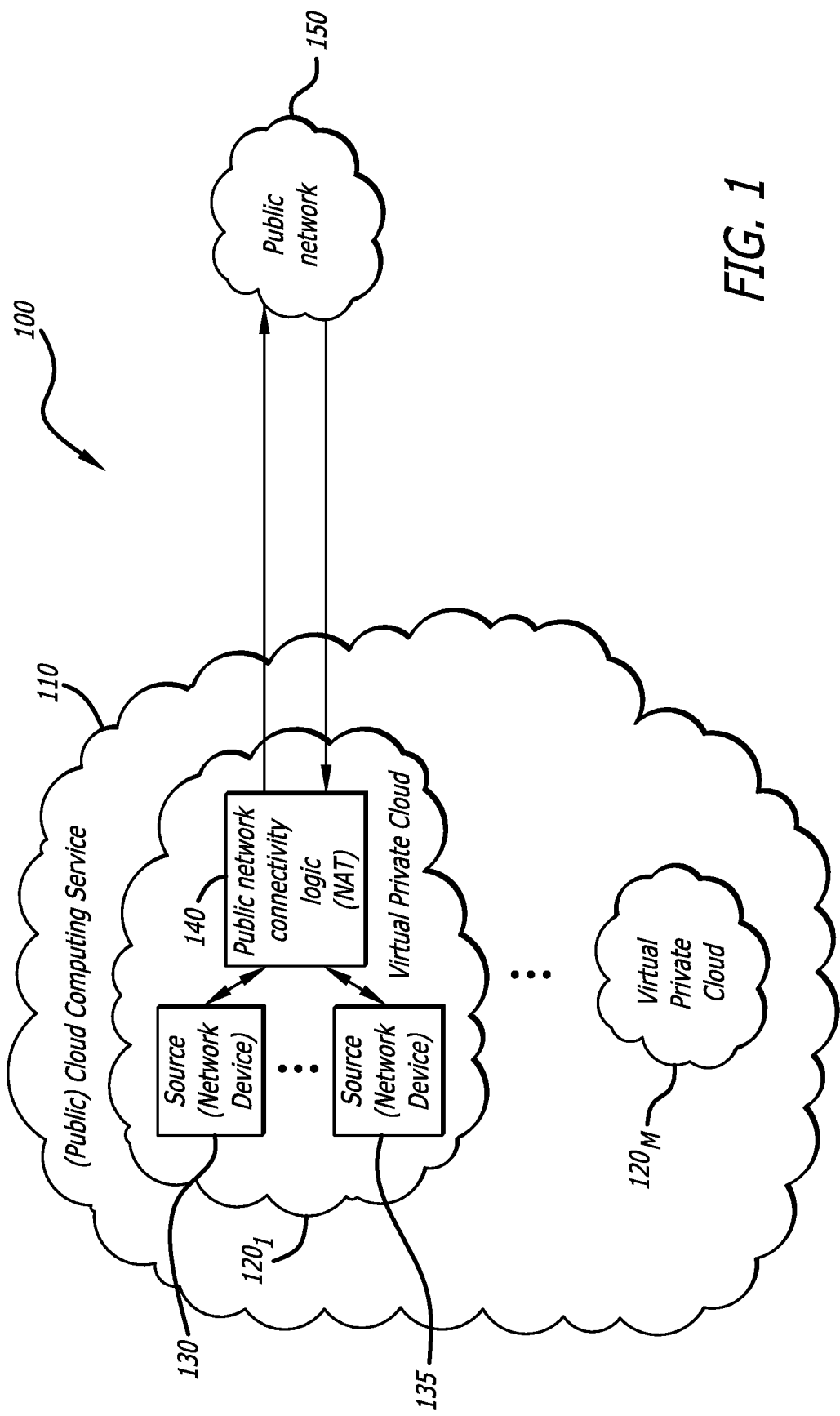
FIG. 1 is an exemplary block diagram of a network architecture with public cloud computing services that include one or more virtual private clouds.

According to one embodiment of the disclosure, a scalable system for supporting multiple network address translation (NAT) logic units within a public cloud is described. The system includes demultiplexer logic and a plurality of NAT control logic units. The demultiplexer logic may be configured as an instance of a virtual machine (hereinafter "virtual machine 'VM' instance") operating as a gateway for a source (e.g., the VM instance operating as a source network device, sometimes referenced as a "source VM instance") with access to a public network. The demultiplexer logic receives a message and, based on the content of the message, determines which NAT control logic unit of the plurality of NAT control logic units is to handle address translations on information within the received message to produce a translated message. The translated message is routed to a destination network device located on the public network. Hence, the demultiplexer logic and the multiple NAT control logic units provide connectivity between the source operating in a virtual private cloud and a destination operating in the public network with better optimization of data traffic workload.

Communicatively coupled to the demultiplexer logic, the plurality of NAT control logic units may correspond to a plurality of VM instances, where each NAT control logic unit is capable of performing one or more address translations on content within incoming messages from a source (e.g., source virtual machine) within a virtual private cloud during a particular communication session. The address translation is conducted prior to forwarding the translated message(s) to the public network. Additionally, each NAT control logic unit is capable of performing one or more address translations on content of a return messages received from a destination (network device) within the public network prior to the forwarding a translated return message back to the source.

With respect to the message flow, when accessing the public network during a particular communication session, a source directs a message to the demultiplexer logic. The message includes a data section and a header section, which may include a source (private) IP address, source port number, destination public IP address, or the like. Based on a result of one or more hash-type functions conducted on at least a portion of the header section, such as the source port number and/or the source (private) IP address, the demultiplexer logic selects a particular NAT control logic unit, and forwards the message to that NAT control logic unit. The hash-type function(s) used, such as a modulo operation, arithmetic operation or one-way hash operation (e.g., message digest 5 "MD5", etc.) for example, may be dynamically selected or static in nature.

Each NAT control logic unit performs the network address translation by substituting (i) the source (private) IP address within an incoming message with a public IP address of the NAT control logic unit and/or (ii) a source port within the incoming message with a selected port from one or more ports managed by the NAT control logic unit. Thereafter, the translated message, including the public IP address of the NAT control logic unit as its source address and/or the selected port as its source port number, is forwarded to a destination device operating within the public network.

Upon receipt of a return message in response to the translated message, the NAT control logic unit substitutes (i) a destination IP address of the return message with the source (private) IP address of the source contained in the original incoming message during this communication session and (ii) a destination port number with the source port number also contained in the original incoming message. The translated return message is forwarded to the source during this communication session. These network address translations continue as describe for an entire communication session such as until a Transmission Control Protocol (TCP) connection close.

I. Terminology

In the following description, certain terminology is used to describe features of the invention. For example, in certain situations, the terms "logic" and "logic unit" are representative of hardware, firmware, software or a running process that is configured to perform one or more functions. As hardware, logic (or logic unit) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

The logic (or logic unit) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, a hard disk drive, an optical disc drive, or a portable memory device. As firmware, the executable code may be stored in persistent storage.

The term "computerized" generally represents that any corresponding operations are conducted by hardware in combination with software and/or firmware. A "message" generally represents data for transfer in a structured format, such as one or more packets.

The term "network device" should be construed as (1) a device with data processing or storage capability and/or a capability of connecting to any type of network, such as a public network (e.g., Internet) and/or a private network (e.g., a wireless data telecommunication network, a local area network "LAN", etc.), or (2) a virtualization of that device. With respect to a virtualized representation, the network device may be in the form of a virtual machine (VM) instance. Examples of different types of network devices may include, but are not limited or restricted to a physical or virtualized version of a network device, including any of the following: a client device (e.g., a laptop, a smartphone, a tablet, a desktop computer, a netbook, a medical device, or any user-controlled electronic device); an intermediary device that facilitates the transfer of data, normally from one network to another network (e.g., router, brouter, bridge, switch, gateway, or any other type of data forwarding device); or a destination device (e.g., a server, a mainframe, another client or intermediary device). As a visualized version, the client device may be part of a virtual private cloud.

The term "interconnect" may be construed as a physical or logical communication path between two or more network devices. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

For this disclosure, the term "private IP address" may be construed as an IP address that may not be routable on the Internet. Normally, an IP address that is in the range of 172.16.0.0/12, 192.168.0.0/16 and 10.0.0.0/8 is a private IP address. Additionally, a "virtual private cloud" (VPC) may be construed as an environment where all virtual machines or hosts that belong to the virtual private cloud share a private network address range. Hence, the virtual private cloud may be associated with an isolated, non-routable network with a private IP address range that, when deployed within a public cloud, offers isolation among consumers on the public cloud. With respect to virtualization, the client device may be part of the virtual private cloud.

The term "network address translation" or "NAT" may be construed as a logic-based function that alters network address information in the header section of the message, such as an address and/or port of the original IP address space, into different network address information while in transit. "NAT" is often used for a device (e.g., machine/host) with private IP address to gain access to the public network (e.g., Internet).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Referring to FIG. 1, an exemplary block diagram of a network architecture 100 with cloud computing services 110, which includes one or more virtual private clouds $120_1$-$120_M$ (M≥1) is shown. Herein, the cloud computing services 110 may operate as a public cloud, which provides access to hosted resources (e.g., applications, storage, etc.). This allows multiple computing devices from different networks, such as network devices (sources) 130 and 135 for example, to run host applications. Each plurality of virtual private clouds $120_1$-$120_M$ features a public network connectivity logic 140, which is responsible for establishing and maintaining communications between the corresponding virtual private cloud $120_i$ (M≤i≤1) and a public network 150.

As a public cloud, the cloud computing services 110 features virtual private clouds "VPCs" (e.g., VPC $120_1$), which may include one or more virtual machines without a public IP address for communication with a public network (e.g., Internet) 150. Hence, the public network connectivity logic 140 provides for such connectivity to the public network 150. According to one embodiment of the disclosure, the public network connectivity logic 140 includes network address translation (NAT) functionality, as described below.

Figure 2:
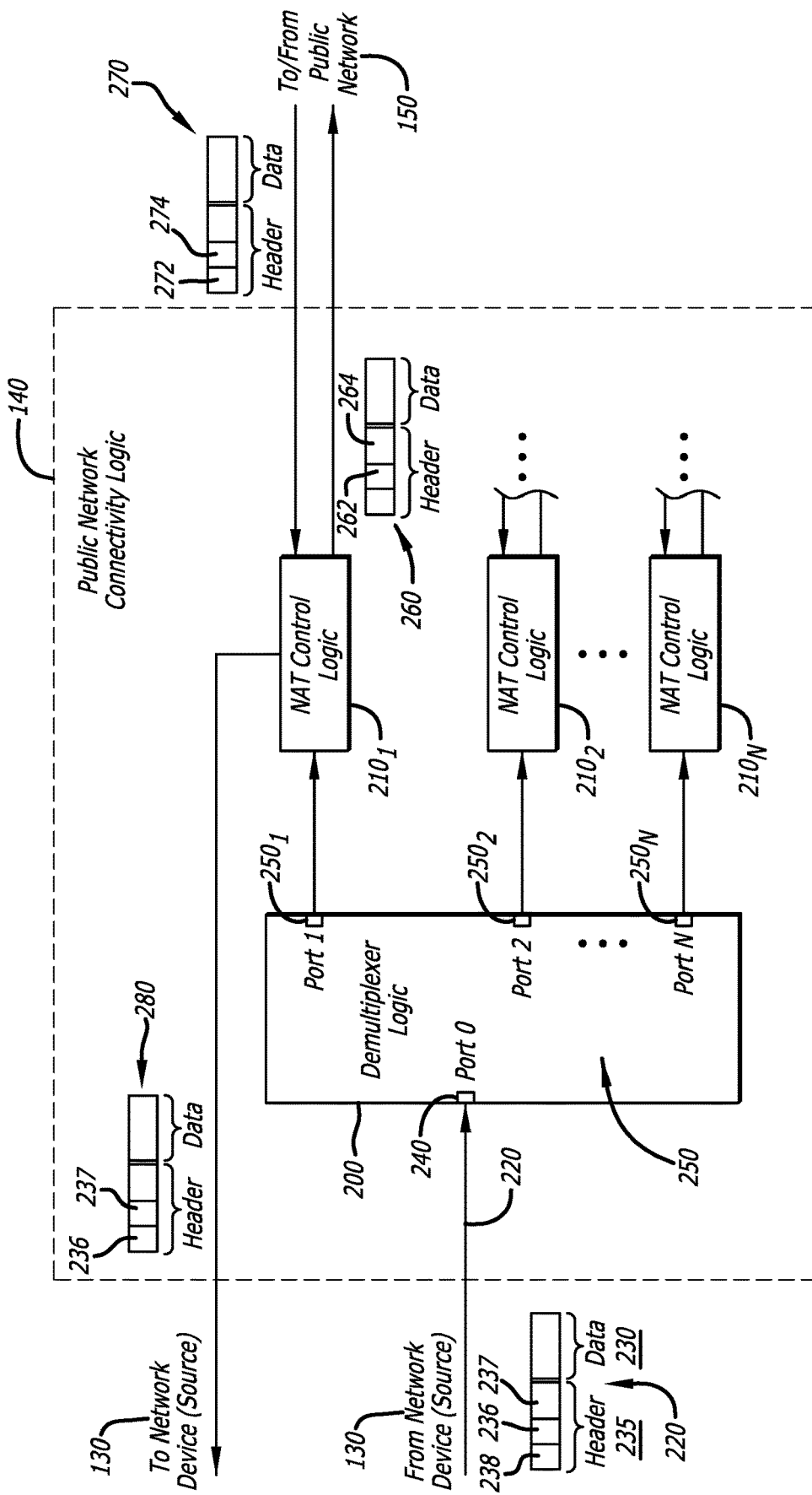
FIG. 2 is a first exemplary embodiment of public network connectivity logic implemented with a network (source) device or as part of the public cloud computing services for establishing and maintaining communication sessions with a public network.

Referring now to FIG. 2, a first exemplary embodiment of the public network connectivity logic 140 implemented as part of the virtual private cloud $120_1$ for establishing and maintaining communication sessions with the public network 150 is shown, although it is contemplated that, in some situations, the public network connectivity logic 140 may be implemented as part of the network device 130 (e.g., source virtual machine). The public network connectivity logic 140 includes demultiplexer logic 200 and a plurality of network address translation (NAT) control logic units $210_1$-$210_N$ (N≥1). According to this embodiment of the disclosure, demultiplexer logic 200 operates as a gateway for NAT functionality by receiving an incoming message 220 that is part of a communication session (e.g., a TCP communication session) directed to a destination network device (not shown) located in the public network 150 of FIG. 1 and determining which particular NAT control logic units $210_1$, . . . , or $210_N$ is to receive the message 220 (or at least content of the message 220). This determined path for the message 220 (or at least content of the message 220) may bypass conventional NAT functionality that may otherwise be provided by the cloud computing services 110.

Figure 3A:
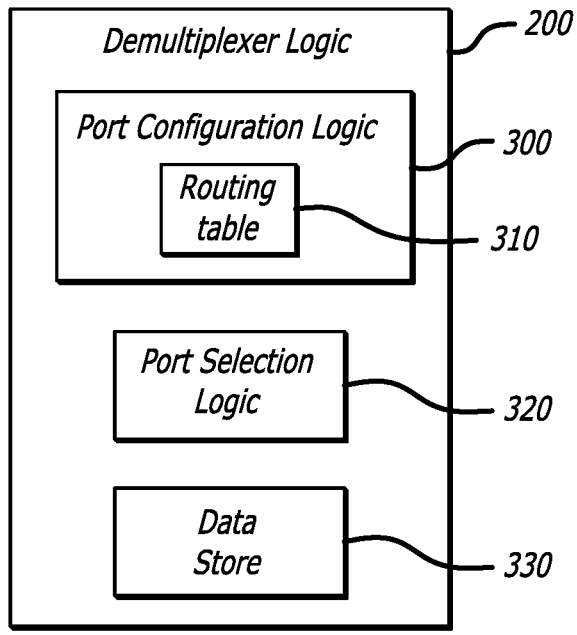
FIG. 3A is an exemplary embodiment of demulitpxer logic for establishing communications with a selected network address translation (NAT) control logic of FIG. 2.

As shown in FIGS. 2 and 3A, the demultiplexer logic 200 may be configured as a VM instance, which receives the incoming message 220 and, based on the content of the message 220, determines which NAT control logic unit $210_1$, . . . , or $210_N$ is assigned for handling address translations on selected content of the incoming message 220. The address translations are design to convert the message 220 into a format for transmission to a destination device located on the public network (not shown). As shown, the demultiplexer logic 200 includes a single ingress port 240 (port_0) and multiple egress ports 250 (port_1 $250_1$, . . . , port N $250_N$). According to this embodiment, each port (e.g., port_1 $250_1$-port N $250_N$) and corresponding NAT control logic unit $210_1$-$210_N$ is configured to correspond to a particular subnetwork of the public network 150. Such configuration may be accomplished by port configuration logic 300 of FIG. 3A which, according to one embodiment of the disclosure, receives a routing table 310 that is uploaded from a user (or administrator). The routing table 310 identifies which egress ports $250_1$-$250_N$ are associated with which NAT control logic units $210_1$-$210_N$. According to another embodiment, the routing table 310 is static or is automatically derived during configuration without user intervention.

More specifically, in response to an attempt by the client device to access the public network 150 during a particular communication session, the demultiplexer logic 200 receives the incoming message 220. The incoming message 220 includes a data section 230 and a header section 235, which may include a source (private) IP address 236, source port number 237, destination public IP address 238, or the like. In order to determine a path for the incoming message 220 (or at least content of the message 220), the port selection logic 320 of FIG. 3A extracts at least a portion of the content from the header section 235 and conducts an operation on the content to produce a result that identifies one of the plurality of NAT control logic units $210_1$-$210_N$. The data store 330 provides temporary storage for the extracted information and the result produced.

As a first illustrative example, according to one embodiment of the disclosure, the port selection logic 320 obtains a source port number 237 (or a portion thereof) from the message 220. The port selection logic 320 conducts a modulo N operation on the source port number 237 (or a portion thereof) to produce a result. The result is a value (0→N−1) which corresponds to one of the "N" egress ports 250 (e.g., port_1 $250_1$→port N $250_N$). The egress ports (port_1 $250_1$→port N $250_N$) are inputs for NAT control logic units $210_1$-$210_N$, respectively.

As a second illustrative example, according to another embodiment of the disclosure, the port selection logic 320 obtains a source address 236 (or a combination of the source address 236 and the source port number 237) from the message 220. The port selection logic 320 conducts a modulo N operation on the source address 236 (or a combination of the source address 236 and the source port number 237) to produce a result. The result is a value (0→N−1) which corresponds to one of the "N" egress ports 250 (port_1 $250_1$→port N $250_N$), respectively.

As a third illustrative example, the port selection logic 320 obtains the source address 236 and/or the source port number 237 (or a portion thereof) from the message 220. The port selection logic 320 conducts one-way hash operation on the source address 236 and/or the source port number 237 (or a portion thereof) to produce a hash result. Based on a particular portion of the hash result (e.g., the value of a combination of one or more bits of the hash result such as the least significant bits, most significant bits or other grouping of bits) or an arithmetic result of certain portions of the hash result, a value corresponding to one of the "N" egress ports 250 (port_1 $250_1$→port N $250_N$) is determined. The egress ports (port_1 $250_1$→port N $250_N$) are inputs for NAT control logic units $210_1$-$210_N$, respectively.

Based on the result that identifies one of the plurality of NAT control logic units $210_1$-$210_N$, the port selection logic 320 controls a forwarding of the message 220 (or at least content of the message 220) to the selected NAT control logic unit (e.g., NAT control logic $210_1$).

Figure 3B:
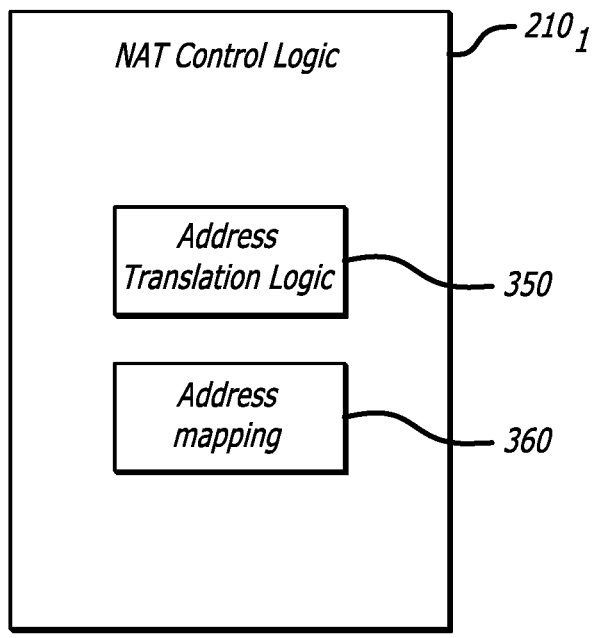
FIG. 3B is an exemplary embodiment of the selected NAT control logic of FIG. 3A.

Communicatively coupled to egress port (port_1 $250_1$) of the demultiplexer logic 200, the NAT control logic unit $210_1$ may perform one or more address translations on the content of the incoming message 220. The address translation is conducted prior to forwarding a translated message 260 to the public network 150 by an address translation logic 350 of FIG. 3B. According to one embodiment of the disclosure, the NAT control logic unit $210_1$ performs the network address translation by substituting (i) the source (private) IP address 236 with a public IP address 262 of the NAT control logic unit $210_1$ and/or (ii) the source port number 237 with a selected port 264 from one or more ports managed by the NAT control logic unit $210_1$. Thereafter, the mapping of the source (private) IP address 236 with the public IP address 262 and/or (ii) the source port number 237 with the selected port 264 is maintained in the address mapping 360 of FIG. 3B. Thereafter, the translated message 260, including the public IP address 262 of the NAT control logic unit $210_1$ as its source address and the selected port 264 as its source port, is forwarded to a destination device operating within the public network 150.

Upon receipt of a return message 270 in response to the translated message 260, the NAT control logic unit $210_1$ substitutes (i) a destination IP address 272 of the return message 270 with the source (private) IP address 236 and (ii) a destination port number 274 of the return message 270 with the source port number 237 also contained in the original incoming message 220. The translated return message 280 is forwarded to the client device during this communication session. These network address translations continue as describe for the entire communication session until the communication session completes.

III. General Message Flow

Figure 4A:
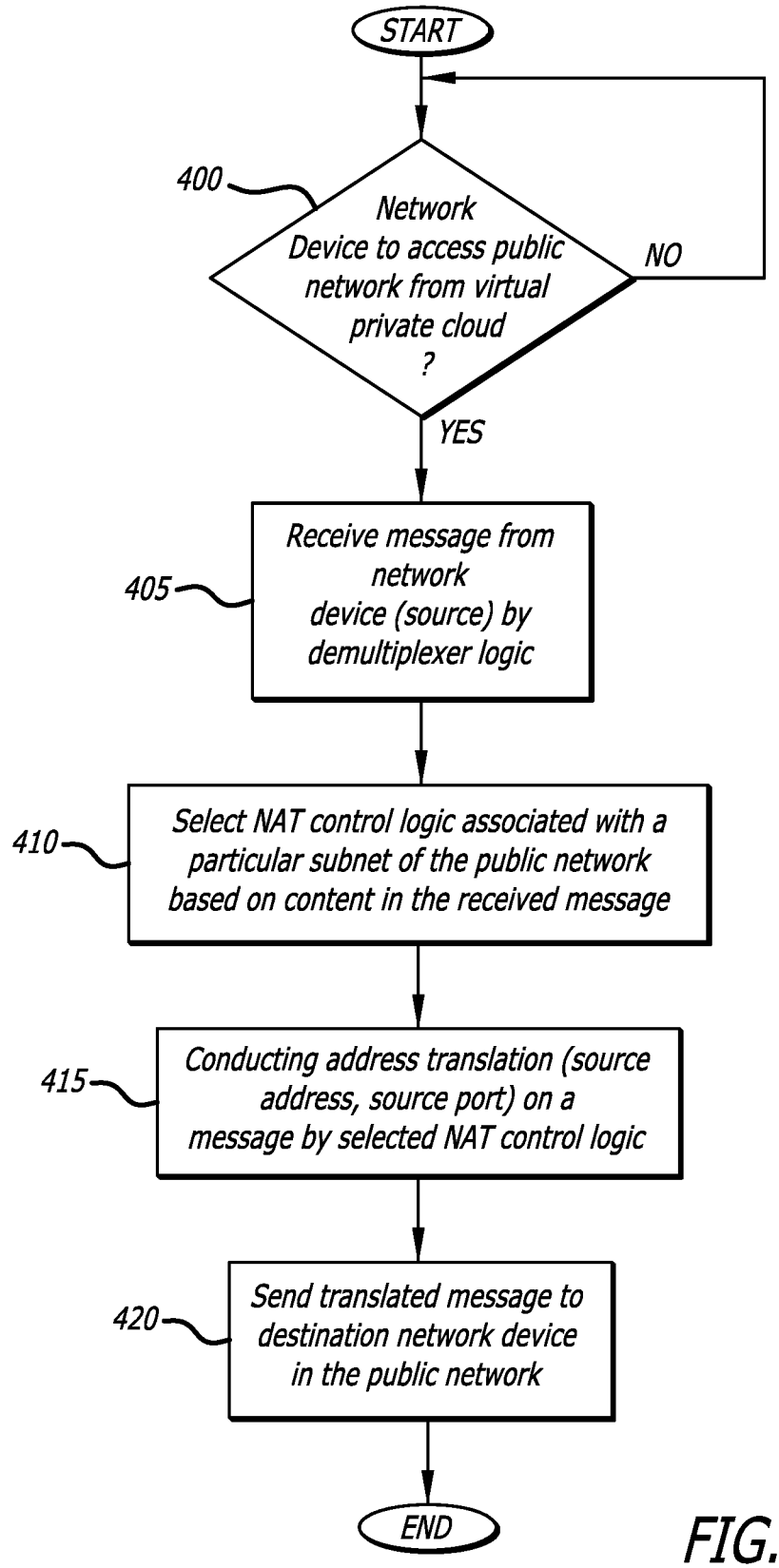
FIG. 4A is a first exemplary flowchart of the operations conducted by demultiplexer logic and the NAT control logic of FIG. 2 to gain access to the public network.

Referring to FIG. 4A, a first exemplary flowchart of the operations conducted by demultiplexer logic and the NAT control logic of FIG. 2 to gain access to the public network is shown. Herein, when a source (e.g., network (client) device) is attempting to access the public network from its virtual private cloud, an incoming message from the source is received by the demultiplexer logic (blocks 400 and 405). In response to receipt of the incoming message seeking access to the public network, the demultiplexer logic selects a NAT control logic unit (e.g., a VM instance with NAT functionality) to receive content from the incoming message (block 410). The selection of the particular NAT control logic unit is based, at least in part, on the content of the incoming message. For instance, the source port number and/or source address may be used in determining the selected NAT control logic unit from multiple NAT control logic units.

Thereafter, the selected NAT control logic unit conducts an address translation on the contents of the incoming message so that any messages, in response to the translated message directed to the public network, are directed to the selected NAT control logic unit. This may involve substituting (i) the source (private) IP address originally in the incoming message with the public IP address of the NAT control logic unit and/or (ii) the source port number originally in the incoming message with the selected port from one or more ports managed by the selected NAT control logic unit (block 415). Thereafter, the translated message is sent to a targeted destination device in the public network (block 420).

Figure 4B:
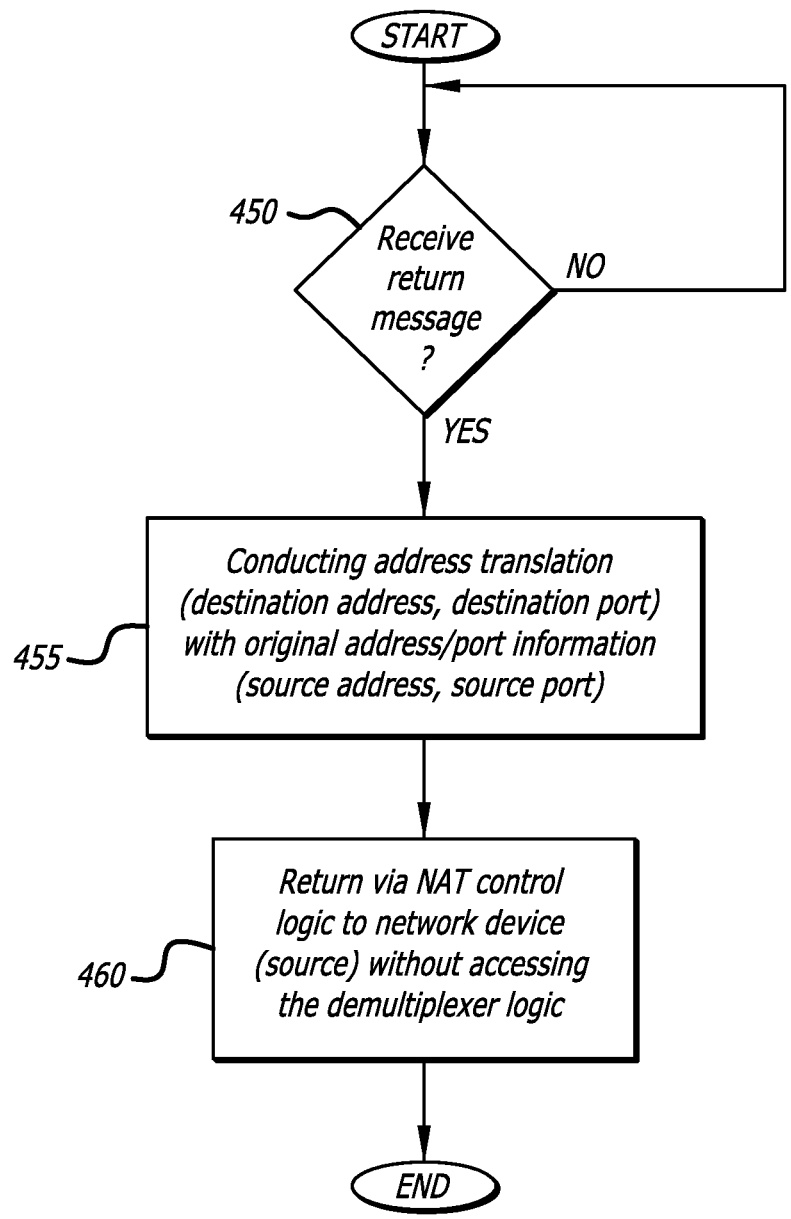
FIG. 4B is a second exemplary flowchart of the operations conducted by the NAT control logic of FIG. 2 in returning a message received from the public network to the network (source) device.

Referring now to FIG. 4B, a second exemplary flowchart of the operations conducted by the NAT control logic in forwarding a message received from the public network is shown. Herein, in response to receipt of a message that is in response to the translated message previously directed to the public network (hereinafter "return message"), the NAT control logic unit conducts an address translation on the contents of the return message (blocks 450 and 455). This may involve substituting (i) the destination IP address of the return message with the source (private) IP address originally in the incoming message from the source (e.g., network device 130 of FIG. 1) and/or (ii) the destination port number of the return message with the source port number originally in the incoming message from the source. Thereafter, the translated return message is returned to the source without accessing the demultiplexer logic (block 460).

Figure 5:
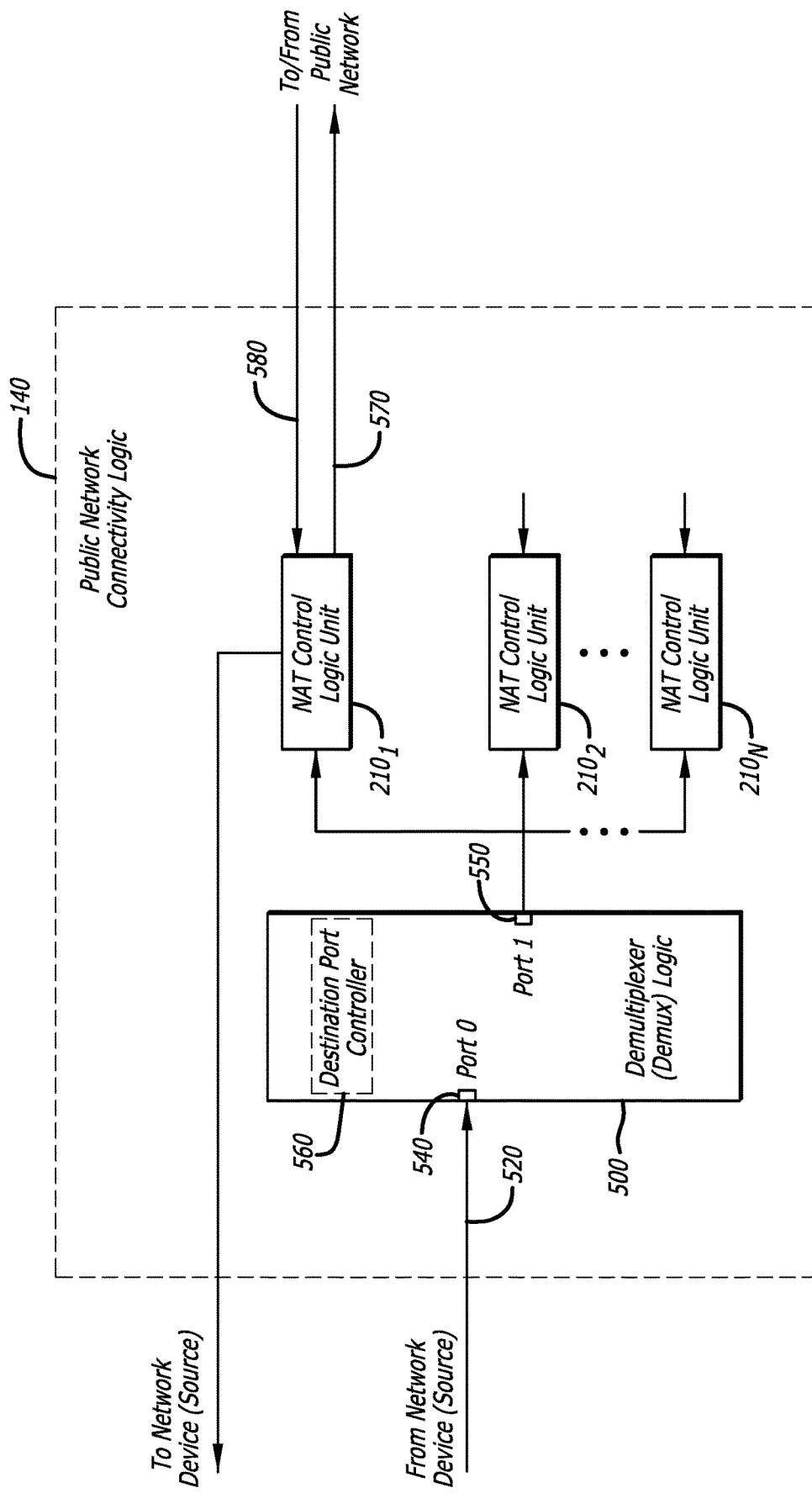
FIG. 5 is a first exemplary embodiment of public network connectivity logic implemented with a network (source) device or as part of the public cloud computing services for establishing and maintaining communication sessions with a public network.

Referring now to FIG. 5, a second exemplary embodiment of the public network connectivity logic 140 implemented as part of the virtual private cloud $120_1$ for establishing and maintaining communication sessions with the public network 150, and in some situations, may be implemented as part of the network device 130 (e.g., source virtual machine) is shown. The public network connectivity logic 140 includes a demultiplexer logic 500 and the plurality of network address translation (NAT) control logic units $210_1$-$210_N$ (N≥1). According to this embodiment of the disclosure, the demultiplexer logic 500 operates as a gateway for NAT functionality by receiving an incoming message 520 that is part of a communication session (e.g., a TCP communication session) with a targeted destination network device (not shown) located in the public network 150 of FIG. 1.

Similar to FIG. 2, the demultiplexer logic 500 may be configured as a VM instance, which receives the incoming message 520 and, based on the content of the message 520, determines which NAT control logic unit $210_1$, . . . , or $210_N$ is assigned for handling address translations on selected content of the incoming message 520 in order to convert the message 520 into a format for transmission to a destination device located on the public network (not shown). As shown, the demultiplexer logic 500 includes an ingress port 540 (port_0) and an egress port 550 (port_1). For this embodiment, the egress port 550 may be programmable, by a destination port controller 560, for controlling a path for the contents of the message 520 to be directed a selected NAT control logic unit $210_1$-$210_N$.

In determining the path for contents of the incoming message 520, as illustrated in FIG. 3A, the port selection logic 320 extracts at least a portion of the content from the header section of the incoming message 520 and conducts one or more operations on at least the portion of the content to produce a result. The result identifies one of the plurality of NAT control logic units $210_1$-$210_N$. The operation(s) may include a modulo N operation, a one-way hash operation, one or more arithmetic logical operations (e.g., Exclusive OR "XOR", AND, OR, etc.), or the like. Based on the result that identifies one of the plurality of NAT control logic units $210_1$-$210_N$, the port selection logic 320 controls a forwarding of the contents of the message 220 to the selected NAT control logic unit (e.g., NAT control logic $210_1$).

As previously described, communicatively coupled to egress port 550 of the demultiplexer logic 500, the NAT control logic unit $210_1$ may perform one or more address translations on selected content of the incoming message 520. The address translation(s) is conducted prior to forwarding a translated message 570. According to one embodiment of the disclosure, the NAT control logic unit 210$_1$ performs the network address translation by substituting (i) the source (private) IP address within the header section of the message 520 with the public IP address of the NAT control logic unit 210$_1$ and/or (ii) the source port number address within the header section of the message 520 with a selected port from one or more ports managed by the NAT control logic unit 210$_1$. Thereafter, the mapping is maintained between the source (private) IP address and the public IP address and/or (ii) the source port number and the selected port 244. The mapping may be subsequently used for routing of a return message 580 back to the network (source) device as described above. The translated message 570, including the public IP address of the NAT control logic unit 210$_1$ as its source address and the selected port as its source port, is forwarded to a destination device operating within the public network.

Figure 6:
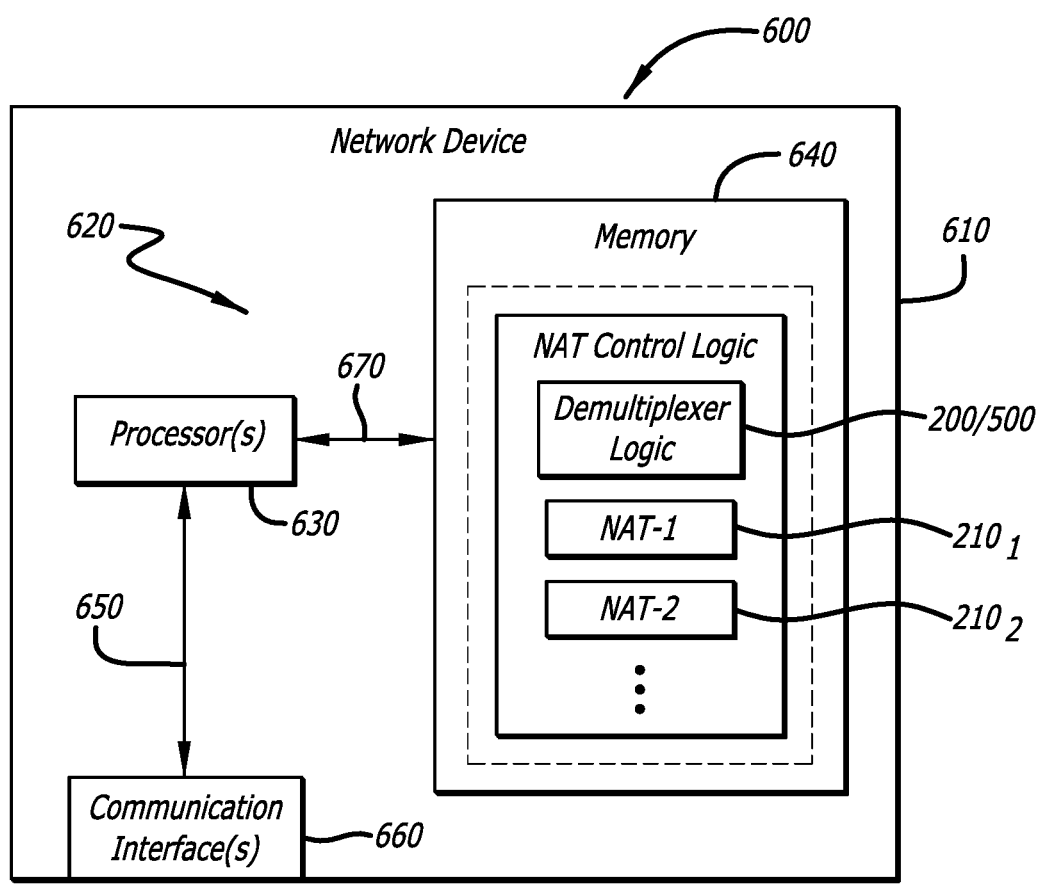
FIG. 6 is a physical representation of an embodiment of a network device deployed within a virtual private cloud with the public network connectivity logic.

Referring now to FIG. 6, a physical representation of a network device 600 deployed within a virtual private cloud with the public network connectivity logic 140 is shown. The network device 600 features a housing 610, which is made entirely or partially of a rigid material (e.g., hardened plastic, metal, glass, composite or any combination thereof) that protect circuitry 620 (e.g., one or more processor 630, a memory 640, etc.) within the housing 610. Coupled via a first transmission medium 650, the processor(s) 630 is coupled to communication interface logic 660, which may be implemented as one of the network interfaces 130, namely a physical interface including one or more ports for wired connectors. Additionally, or in the alternative, the communication interface logic 660 may be implemented as one or more radio units for supporting wireless communications with other electronic devices.

The memory 630 is configured to store software logic that are part of the public network connectivity logic 140, including the demultiplexer logic 200/500 and the multiple NAT control logic units 210$_1$-210$_N$. The software logic is processed by processor(s) 620 communicatively coupled to the memory via a second transmission medium 670. It is contemplated that the memory 630 may be a combination of semiconductor memory and/or a storage device with a large amount of storage capability such as a solid state drive (SSD) or a hard disk drive (HDD). An interface for configuring the public network connectivity logic 140 with scalable NAT functionality is shown in FIG. 7.

Although not shown, it is contemplated that the public network connectivity logic 140 may be configured with scalable firewall functionality. For that embodiment, in lieu of NAT control logic, different firewall instances are communicatively coupled to the demultiplexer logic. The firewall instances are configured to perform filtering based on address, port numbering and/or content. Such filtering may be conducted to provide for scalable intrusion detection or intrusion protection capabilities. Additionally, or in the alternative, the firewall instances may be configured to perform a logging function to generate a log of some or all of the packets routed into or from the firewall instance(s).

It is further comtemplated that the described system scales NAT function by deploying a demultiplexer (Demux) machine that distributes packets to a group of machines (NAT control logic units) where each machine carries NAT function independently. The Demux machine may have multiple network interfaces, each one belongs to separate subnetwork of the public network and where the default gateway is the corresponding NAT control logic unit.

In the foregoing description, the invention is described with reference to specific exemplary embodiments thereof. It will, however, be evident that various modifications and changes may be made thereto without departing from the broader spirit and scope of the invention.

What is claimed is:

1. A network device adapted for operating within a virtual private cloud, comprising:
    one or more hardware processors; and
    a memory coupled to the one or more hardware processors, the memory stores
        a plurality of network address translation (NAT) control logic units, and
        a demultiplexer logic that, when executed by the one or more hardware processors, receives an incoming message and, based at least in part on information within the incoming message, determines a selected NAT control logic unit to receive at least a portion of the information within the incoming message by conducting one or more hash-type functions on at least a source private Internet Protocol (IP) address or a source port of a header section of the message to produce a result for use in determining the selected NAT control logic unit;
    wherein the selected NAT control logic unit handles address translation for routing of a message based on the incoming message to a public network.

2. The network device of claim 1, wherein each of the plurality of NAT control logic units corresponds to a virtual machine instance.

3. The network device of claim 1, wherein the message is received from a source deployed within a virtual private cloud network.

4. The network device of claim 1, wherein the one or more hash-type functions includes a Message Digest based hash operation.

5. The network device of claim 1, wherein the one or more hash-type functions includes a modulo operation, being conducted on a source private Internet Protocol (IP) address or a source port within the header section of the message.

6. The network device of claim 1, wherein a private source address of the translated message includes a public IP address of the selected NAT control logic unit.

7. The network device of claim 1, wherein a source port of the translated message includes a selected port from one or more ports managed by the selected NAT control logic unit.

8. The network device of claim 1, wherein the selected NAT control logic unit is configured to, upon receipt of a return message, substitute a destination IP address of the return message with a source IP address of the source contained in the incoming message.

9. The network device of claim 1, wherein the selected NAT control logic unit is configured to, upon receipt of a return message, substitute a destination port number with a source port number contained in the incoming message.

\* \* \* \* \*